United States Patent [19]

Iwasaki et al.

[11] 4,228,031
[45] Oct. 14, 1980

[54] METHOD OF MAKING IMPERMEABLE MICROCAPSULES

[75] Inventors: Hiroshi Iwasaki, Kawanishi; Shigeo Okamoto, Amagasaki; Mitsuru Kondo, Kawanishi, all of Japan

[73] Assignee: Kanzaki Paper Manufacturing Co., Ltd., Tokyo, Japan

[21] Appl. No.: 902,882

[22] Filed: May 4, 1978

[30] Foreign Application Priority Data

May 4, 1977 [JP] Japan ................................. 52-51488

[51] Int. Cl.$^2$ ............................................. B01J 13/02
[52] U.S. Cl. ................................. 252/316; 282/27.5; 424/32; 428/307; 428/914
[58] Field of Search ........................ 252/316; 427/341; 424/32

[56] References Cited

U.S. PATENT DOCUMENTS

| 3,432,327 | 3/1969 | Kan et al. ........................... 282/27.5 |
| 3,565,559 | 2/1971 | Sato et al. ......................... 252/316 X |
| 3,607,775 | 9/1971 | Yoshida et al. ..................... 252/316 |

Primary Examiner—Richard D. Lovering
Attorney, Agent, or Firm—Cushman, Darby & Cushman

[57] ABSTRACT

The method of making impermeable microcapsules comprises the steps of preparing an aqueous dispersion of microcapsules having a capsule wall of a water-insoluble polyamine-epoxy resin and adding to the aqueous dispersion an electrolyte to dehydrate the microcapsules.

5 Claims, 2 Drawing Figures

METHOD OF MAKING IMPERMEABLE MICROCAPSULES

BACKGROUND OF THE INVENTION

This invention relates to a novel method of making microcapsules and particularly to a method of making microcapsules having an improved permeability which are useful for the manufacture of pressure-sensitive copying papers or heat-sensitive recording papers.

Pressure-sensitive copying papers and heat-sensitive recording papers which utilize the color developing reaction between electron donating organic chromogenic material (hereinafter referred to as "color former") and electron accepting acidic reactant material (hereinafter referred to as "acceptor") are now widespread. In pressure-sensitive copying paper at least one of the color former and the acceptor is contained in microcapsules so as to be isolated from the other and they become into contact with each other by rupturing such microcapsules to develop a color. In a most typical type of pressure-sensitive copying paper minute oil droplets in which the color former is dispersed or dissolved are encapsulated and coated onto papers.

Microcapsules also find their usefulness in other fields such as adhesives, fertilizers, pharmaceuticals, foods and cosmetics, etc.

There are known various methods for making microcapsules useful for the above mentioned purpose. Among them there are included the "complex coacervation" method, e.g., as disclosed in U.S. Pat. No. 2,800,457, the "simple coacervation" method, e.g., as disclosed in U.S. Pat. No. 2,800,458, the "interfacial polycondensation" method e.g., as disclosed in British Patent Specification No. 950,443 the "in situ polymerization" method e.g., as disclosed in British Patent Specification No. 989,264, the "solidifying-in-liquid" method and the "drying-in-liquid" method.

The microcapsules should have a good impermeability so that the core material which is usually in the form of liquid particles can be prevented from diffusing outside through the capsule wall. The diffusion of the core material in the microcapsules is apt to occur when the environment conditions such as temperature and moisture are changed. Heretofore, various attempts have been made to improve the impermeability of the microcapsules.

The microcapsules having hydrophobic particles as the core material are usually produced through the utilization of the technique of phase separation in an aqueous medium from the viewpoint of its economical advantage and easy working. However, the microcapsules thus produced are not good in the water resistance owing to the property of material used. Some attempts have been made to improve the impermeability of the capsule wall of the microcapsules produced. For example, there have been proposed the utilization of a cross linking agent such as formaldehyde as disclosed in U.S. Pat. No. 2,800,457, the utilization of chemically reactive additives such as phenol compounds and urea as disclosed in Japanese Patent Publications No. 30,030 of 1975, 34,513 of 1975 and No. 34,514 of 1975 and the utilization of polycondensationable prepolymers as the capsule wall forming material as disclosed in Japanese Patent Publications No. 12,518 of 1963, No. 4,717 of 1973 and No. 13,456 of 1974. The proposed techniques are disadvantageous because they require either use of specially selected additives or additional and complicated steps in addition to the fact that the impermeability, especially, the water resistance is not satisfactorily improved.

The water content in the core material and the capsule wall forming material of microcapsules has a great influence on the porosity of the capsule wall which result in decreasing the impermeability. An attempt was made to dehydrate the water contained in the microcapsules by utilizing as a drying agent a water-miscible volatile organic solvent or hygroscopic glycol for improving the impermeability of the capsule wall of the microcapsules, as disclosed in Japanese Patent Publication No. 21,206 of 1971. This technique involves such disadvantages that the core material of the microcapsules is polluted by the drying agent used, that isolation of microcapsules is required before the dehydration step and that it is an expensive way.

The principal object of the invention is to provide a novel and improved method for making microcapsules having a highly improved impermeability.

Another object of the invention is to provide a novel and improved method for making microcapsules, each having a highly condensed and homogeneous capsule wall.

A further object of the invention to provide a novel method of making impermeable microcapsules in a simple and effective manner.

SUMMARY OF THE INVENTION

According to the invention the method for making impermeable microcapsules comprises the steps of preparing an aqueous dispersion of microcapsules each having a capsule wall of a water-insoluble polyamine-epoxy resin and adding to said aqueous dispersion an electrolyte to dehydrate said microcapsules. Preferably, dehydration of the microcapsules is carried out to such an extent that each of the microcapsules is deformed into a hollow ball form.

DETAILED DESCRIPTION OF THE INVENTION

Figure 1:
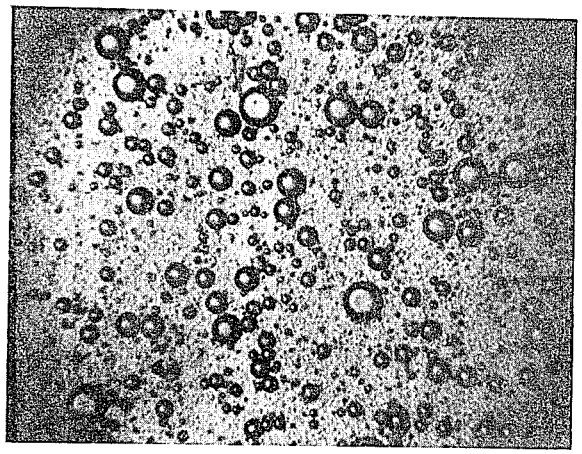

According to the invention the microcapsules have a capsule wall of a water-insoluble polyamine-epoxy resin. Such the microcapsules may be produced by curing the microcapsules obtained by the phase separation in an aqueous medium, and more preferably through the utilization of the complex coacervation between a cationic polyamine-epoxy resin and an anionic colloid material.

The cationic polyamine-epoxy resin described is a water soluble cationic epoxy resin having a polyamine backbone and an epoxy reactive group. The cationic polyamine-epoxy resin may be prepared by any of known and conventional methods, for example, by reacting a polyamine resin having free NH radicals with an epoxydization agent such as epihalohydrin, by reacting a block or graft copolyamine resin having free NH radicals with an epoxydization agent, or by reacting a starting material for a polyamine resin having free NH radicals with an epoxydization agent before polymerization for producing a polyamine resin.

Among the typically useful cationic polyamine-epoxy resins there may be included: aliphatic polyamine-halohydrin resins such as tetraethylenepentamine-epichlorohydrin resin (described in U.S. Pat. No. 2,573,956); ammonia-epichlorohydrin resins (described in U.S. Pat. No. 2,573,957); polyamide-polyamineepoxy resins derived from a polyalkylenepolyamine having at least one secondary amino group and at least two primary amino group such as diethylenetriamine, triethylenetetramine and tetraethylenepentamine with a polycarboxylic acid such as saturated aliphatic dibasic carboxylic acids, for example, adipic acid and succinic acid, diglycolic acid and unsaturated polycarboxylic acids (described in U.S. Pat. Nos. 2,926,116, 2,926,154 and 3,125,552); polyamide-polyamine-epoxy resins derived from a polyalkylenepolyamine with a monohalocarboxylic acid or a dimer acid (described in Japanese Patent Publications No. 27,908 of 1969 and No. 20,758 of 1966): polyamide-polyamine-epoxy resins derived from a reaction product of aminocarboxylate with polyalkylenepolyamine (described in U.S. Pat. No. 3,535,288), polyamide-polyamine-epoxy resins derived from polycondensation product of polyalkylenepolyaminocarboxylic acid (described in Japanese Patent Publication No. 27,907 of 1969); polyamide-polyamine-epoxy resins derived from block copolyamide produced by the reaction of lactam with a polyamide formed by condensation of aliphatic dicarboxylic acid and polyalkyleneamine (disclosed in U.S. Pat. No. 3,645,954); polyamide-polyamine-epoxy resins produced by the reaction of methylolpolyacrylamide with a reaction product of a polyalkylenepolyamine with epichlorohydrin (described in Japanese Patent Publication No. 212 of 1960); and chemical modified resins thereof such as resins modified with formaldehyde. urea, aliphatic dialdehyde and urethane to increase the stability of the aqueous solution (described in U.S. Pat. Nos. 3,327,671; 3,372,085 and 3,372,086 and Japanese Patent Publication No. 19,872 of 1969). Among them, polyamide-polyamine-epoxy resins are most preferably used.

The anionic colloid material may also be of any known type so far as it can be used for the complex coacervation. Among the typically useful anionic colloid materials there may be included natural polyanionic polysaccharides such as gum arabic, carrageenan, sodium alginate, pectic acid, tragacanth gum, almond gum and agar-agar; semisynthetic polyanionic polysaccharides such as carboxymethylcellulose, carboxyethylcellulose sulfonated cellulose, sulfonated methylcellulose, phosphated starch, sulfonated starch and sulfonated chitosan; gelatin; casein; synthetic organic anionic colloids such as colloids or polymers having at least one anionic vinylmonomer unit for example polyvinylsulfonic acid, polystyrenesulfonic acid, acrylic acid, methacrylic acid, maleic acid, and crotonic acid, naphthalenesulfonic acid-formaldehyde condensates, and alkylbenzenesulfonic acid; inorganic anionic colloids such as polyphosphates, polysilicate, polymolybdate and polywolframate. Polyanionic polysaccharides are most preferably used.

The composition ratio between the cationic polyamine-epoxy resin and the anionic colloid material is not particularly limited. In order to obtain microcapsules each having a uniform and flexible capsule wall, however, the amount of the anionic colloid material used may be within the range of ¼ to 10 parts by weight, more preferably within the range of 5/6 to 4 parts by weight per one part by weight of the cationic polyamine-epoxy resin.

The reversible coacervate obtained by the coacervation of the two materials in the above mentioned composition ratio is cured by heating to form irreversibly hardened and water-insoluble capsule wall film.

Most preferably, the encapsulation for producing microcapsules having a capsule wall of a water-insoluble polyamine-epoxy resin is carried out through the utilization of the above mentioned complex coacervation technique although any other techniques such as the in situ polymerization disclosed in Japanese Patent Publication No. 24420 of 1973 and the interfacial polycondensation disclosed in Japanese Patent Publication No. 8923 of 1967 are also utilizable.

According to the invention an electrolyte is added to the aqueous dispersion of microcapsules each having a capsule wall of a water-insoluble polyamine-epoxy resin to dehydrate the microcapsules. If an electrolyte is added to a coacervate dispersion in a reversible condition, the electrolyte will merely function as an agent to modify the system, not as a dehydration agent. Accordingly, the addition of an electrolyte should be carried out after the capsule wall of each of microcapsules has been irreversibly hardened and water-insoluble by the curing.

Addition of an electrolyte to the aqueous dispersion of microcapsules results in dehydration of microcapsules in the system. The electrolyte to be added is therefore a water-soluble organic or inorganic compound. Preferably, the electrolyte is a member selected from the group consisting of water-soluble alkali metal salts, water-soluble ammonium salts and mixtures thereof. However, other electrolytes such as polyvalent metal salts are also useful so far as they do not cause undesirable aggregation in the system. The anion which is the other of the pair may be any high molecular or low molecular group. Among the anionic groups, there may be included inorganic ion derived from inorganic acids such as hydrochloric acid, nitric acid sulfuric acid, phosphoric acid, polyphosphoric acid, polysilicic acid, polymolybdic acid and polywolframic acid; and organic ion derived from organic acids such as acetic acid, oxalic acid, citric acid, benzenesulfonic acid, naphthalenesulfonic acid-formaldehyde condensates, vinyl polymers having at least one anionic vinyl monomer unit for example acrylic acid, methacrylic acid and maleic acid, polystyrene sulfonic acid, sulfonated cellulose, phosphated cellulose, carboxyalkylcellulose, carrageenan, alginic acid and pectin.

The kind of the electrolyte to be added may be determined and selected at will according to the material for forming the microcapsule wall.

The dehydration degree of the microcapsules increases according to the amount of the electrolyte added. Addition of the electrolyte in an excess amount does not arrest the dehyration. Accordingly, it is unnecessary to control the amount of the electrolyte added precisely within a limited range. The amount of the electrolyte added may, however, be decided in consideration of the dehydration degree and the kind of the material for forming required the microcapsule wall. Generally speaking the electrolyte may be added to the aqueous dispersion of microcapsules in an amount of 1 to 200 parts by weight, more preferably, 5 to 100 parts by weight, with respect to 100 parts by weight of the microcapsule wall forming material used.

Thus, the water contained in the microcapsules each having a capsule wall of a polyamine-epoxy resin which has been irreversibly hardened by curing and is highly swollen with water is effectively dehydrated without any substantial chemical or physically chemical reaction with the capsule wall forming material in the aqueous medium to form highly condensed microcapsules having a remarkably improved impermeability.

Another important and unexpected result obtained according to the invention is the deformation of each of the microcapsules where the core material is liquid particles. The deformation of the microcapsules are described hereinbelow referring to the drawings.

Figure 2:
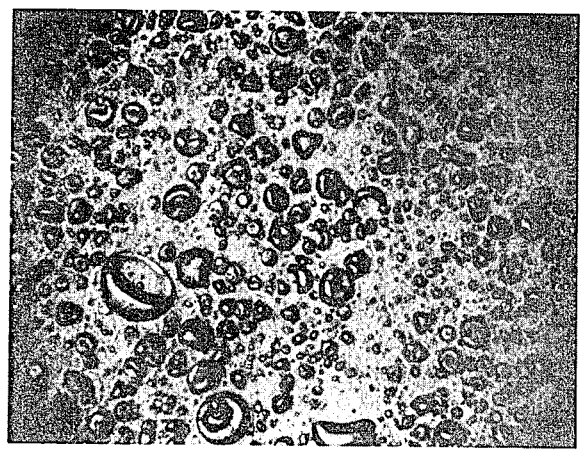

FIG. 1 is a microscopic photograph illustrating an aqueous microcapsule dispersion on an enlarged scale of 400 times before the dehydration by adding sodium chloride as an electrolyte according to the invention; and FIG. 2 is a microscopic photograph illustrating an aqueous microcapsule dispersion on an enlarged scale of 400 times after the dehydration by adding sodium chloride as an electrolyte according to the invention.

As is observed from FIG. 1, each of the microcapsules in the dispersion is in the form of a mono-nucleus spherical shape. To the contrary after dehydration by adding sodium chloride to the aqueous microcapsule dispersion according to the invention, each of the microcapsules is deformed in such a hollow or depressed ball form as illustrated in FIG. 2. This deformation would be observed as a result of effective removal of water contained in each of microcapsules and use of a water-insoluble polyamine-epoxy resin as the capsule wall forming material.

The concave, hollow or depressed shape of the microcapsules finds its practical usefulness in various fields. For example, if such deformed microcapsules are used for the production of usual pressure sensitive copying papers, undesired smudges are prevented and a good recording efficiency is obtained. If utilized for such pressure measuring sheets as disclosed in Japanese Laid Open Patent Publication No. 50,711 of 1976, errors at the small pressure variations can be prevented to the utmost extent and accordingly the measuring accuracy is remarkably enhanced. When utilized for multicolor recording papers as disclosed in Japanese Laid Open Patent Publications No. 26,381 of 1975 and No. 26,383 of 1975, fogging is prevented.

The following examples serve to illustrate the invention in more detail although the invention is not limited to the examples. Unless otherwise indicated, parts and % signify parts by weight and % by weight, respectively.

EXAMPLE 1

100 parts of an alkylnaphthalene was added to 200 parts of a 5% aqueous solution of a cationic polyamide-polyamine-epoxy resin (Sumirez 650 SP produced by Sumitomo Chemical Company, Limited, Japan). The mixture was agitated under a controlled condition to obtain an emulsion of oil droplets having an average particle diameter of 8 microns. 200 parts of a 5% aqueous solution of carboxymethylcellulose was added to the emulsion under continued agitation at 10° C. to deposit a reversible coacervate around each of the oil droplets. The pH of the system was 6.5. Further, the aqueous system was agitated at 45° C. for 3 hours. As the result the capsule wall was changed into an irreversible hardened and water-insoluble wall. The obtained capsules had a mono-nucleus spherical shape as illustrated in FIG. 1. To the dispersion of these capsules 20 parts of sodium chloride was added as an electrolyte. This amount of sodium chloride is equivalent to 100 parts by weight per 100 parts by weight of the capsule wall forming materials. The dehydration of the capsules was caused and it was found with a microscopic examination that each of the microcapsules was deformed to a hollow-ball like shape as illustrated in FIG. 2. The wall film of thus obtained of each of the microcapsules was stable. The microcapsules were not aggregated and were easily isolated. The obtained dry microcapsules had a very good impermeability. The amount of them after standing at the room temperature for 150 days decreased only by 0.8%.

Control 1

Another steps similar to those in Example 1 were repeated except that the capsules were isolated from the capsule dispersion before adding sodium chloride. The capsules tended to be aggregate in the isolating step. The decrease in the amount of dry capsules was 4.6% in the same impermeability test condition as in Example 1.

EXAMPLES 2 TO 6

100 parts of an alkylnaphthalene was added to 200 parts of a 5% aqueous solution of cationic polyurea-polyamide-polyamine-epoxy condensation polymer (U-Ramin P-5200 produced by Mitsui Toatsu Chemicals, Incorporated, Japan). The mixture was agitated under a controlled condition to prepare an emulsion of oil droplets having an average particle diameter of 5 microns. The emulsion wad added to 400 parts of a 5% aqueous solution of gum arabic under agitation to form a reversible coacervate. The aqueous system was further agitated at 50° C. for 5 hours. There was obtained a dispersion of capsules having an irreversibly hardened and water-insoluble wall. To the dispersion, sodium polystyrenesulfonate as an electrolyte was added in such amounts as indicated in Table 1 to prepare five different microcapsule dispersions. The microcapsules were isolated and dried. The moisture resistance of the dry microcapsules was examined. The results are shown in Table 1. The moisture resistance was indicated in terms of the reduced weight percantage of the dry microcapsules after standing them under 90% RH for 3 hours.

Controls 2 to 6

Similar steps to those in Example 2 were taken to prepare five microcapsule dispersions except that sodium polystyrenesulfonate was not added or that oxidized starch, polyvinyl alcohol or polyacrylamide was added in place of sodium polystyrenesulfonate as indicated in Table 1. The moisture resistance of the obtained microcapsules was examined in the same manner as in Example 2. The results was shown in Table 1.

TABLE 1

| | Additives | The amount of additives (dry parts) | Capsule Deformation | Moisture Resistance % |
| --- | --- | --- | --- | --- |
| Control 2 | None | — | None | 32 |
| Example 2 | Sodium polystyrenesulfonate | 1 | a little | 13 |
| Example 3 | " | 5 | found | 7 |
| Example 4 | " | 10 | " | 4 |
| Example 5 | " | 20 | " | 5 |
| Example 6 | " | 50 | " | 4 |
| Control 3 | Oxidized starch | 20 | none | 32 |
| Control 4 | " | 50 | " | 30 |
| Control 5 | Polyvinyl alcohol | 20 | " | 31 |
| Control 6 | Polyacrylamide | 20 | " | 33 |

EXAMPLES 7 TO 14

Similar steps to those in Example 1 were taken to prepare eight different microcapsule dispersions except that 10 parts different electrolytes as indicated in Table 2 were added in place of sodium chloride, respectively. The moisture resistance of the obtained microcapsules was examined in the same manner as in Example 2. The results were shown in Table 2.

TABLE 2.

| | Additives | The amount of additives (dry parts) | Capsule Deformation | Moisture Resistance % |
|---|---|---|---|---|
| Example 7 | Sodium sulfonate cellulose | 10 | found | 4 |
| Example 8 | Potassium polyvinylsulfonate | 10 | found | 5 |
| Example 9 | Ammonium salt of vinylacetate-crotonic acid copolymer | 10 | found | 4 |
| Example 10 | Sodium salt of vinyl acetate-maleic acid copolymer | 10 | found | 4 |
| Example 11 | Sodium salt of ethylene-maleic acid copolymer | 10 | found | 5 |
| Example 12 | Sodium salt of vinyl methylether-maleic acid copolymer | 10 | found | 4 |
| Example 13 | Sodium salt of naphthalenesulfonic acid-formaldehyde condensate | 10 | found | 6 |
| Example 14 | Sodium benzenesulfonate | 10 | found | 7 |

EXAMPLE 15

There were added to 200 parts of a 10% aqueous solution of cationic polyamide-polyamine-epoxy resin (Sumirez) 650 SP produced by Sumitomo Chemical Company, Limited). 100 parts of a solution which contained 2 parts of crystal violet lactone and 1 part of benzoyl leucomethylene blue in a 4:1 mixed solvent of alkylnaphthalene with a water insoluble hydrocarbon. The obtained mixture was agitated under a controlled condition to prepare an emulsion of oil droplets having an average particle diameter of 4 microns. The emulsion was added in the form of droplets into 400 parts of a 5% aqueous solution of carboxymethylcellulose at 10° C. under agitation to deposit a reversible coacervate around each of the oil droplets. The pH of the system was 5.5, 200 parts of water was added to the obtained aqueous system and then the aqueous system was agitated at 45° C. for 3 hours to harden irreversibly the capsule wall.

20 parts of sodium polystyrenesulfonate as an electrolyte was added to the obtained microcapsule dispersion to dehydrate the microcapsules.

To thus obtained microcapsule dispersion 30 parts of cellulose powder and 200 parts of a 10% aqueous solution of oxidized starch were added to obtain a coating composition. The coating composition was coated on one surface of paper of 40 g/m² in an amount of 4 g/m² on dry basis to obtain a capsule coated paper. The capsule coated paper as a pressure-sensitive copying paper was superior in color developing as well as in heat resistance and moisture resistance.

What we claim is:

1. A method for making impermeable microcapsules comprising the steps of preparing coacervates by complex coacervation between a cationic polyamine-epoxy resin and an anionic colloid material, curing by heating to form microcapsules each having a capsule wall of irreversibly hardened and water insoluble polyamine-epoxy resin, preparing an aqueous dispersion of said microcapsules and adding to said aqueous dispersion an electrolyte to dehydrate said microcapsules.

2. A method for making impermeable microcapsules as defined in claim 1, in which said electrolyte is a member selected from the group consisting of water-soluble alkali metal salts, water-soluble ammonium salts and mixtures thereof.

3. A method for making impermeable microcapsules as defined in claim 2, in which said electrolyte is added to said aqueous dispersion in an amount of 1 to 200 parts by weight with respect to 100 parts by weight of microcapsule wall forming material.

4. A method for making impermeable microcapsules as defined in claim 3, in which said electrolyte is added to said aqueous dispersion in an amount of 5 to 100 parts by weight with respect to 100 parts by weight of microcapsule wall forming material.

5. A method for making impermeable microcapsules as defined in claim 1, in which said microcapsules are dehydrated to such an extent that each of said microcapsules are deformed into a hollow or depressed ball form.

* * * * *